(12) United States Patent
Lucky

(10) Patent No.: US 11,165,933 B2
(45) Date of Patent: Nov. 2, 2021

(54) PRODUCTION SLATE DEVICE

(71) Applicant: Lawrence Lucky, Belton, MO (US)

(72) Inventor: Lawrence Lucky, Belton, MO (US)

( * ) Notice: Subject to any disclaimer, the term of this patent is extended or adjusted under 35 U.S.C. 154(b) by 0 days.

(21) Appl. No.: 16/908,172

(22) Filed: Jun. 22, 2020

(65) Prior Publication Data
US 2020/0412917 A1  Dec. 31, 2020

Related U.S. Application Data

(60) Provisional application No. 62/867,082, filed on Jun. 26, 2019.

(51) Int. Cl.
| | | |
|---|---|---|
| *H04N 5/222* | (2006.01) | |
| *G06F 3/14* | (2006.01) | |
| *F21V 23/04* | (2006.01) | |
| *F21V 23/00* | (2015.01) | |
| *F21Y 115/10* | (2016.01) | |

(52) U.S. Cl.
CPC ......... *H04N 5/2228* (2013.01); *F21V 23/003* (2013.01); *F21V 23/04* (2013.01); *G06F 3/14* (2013.01); *F21Y 2115/10* (2016.08); *G09G 2370/18* (2013.01)

(58) Field of Classification Search
CPC ..... H04N 5/2228; F21V 23/003; F21V 23/04; G06F 3/14; F21Y 2115/10; G09G 2370/18
See application file for complete search history.

(56) References Cited

U.S. PATENT DOCUMENTS

| | | | | |
|---|---|---|---|---|
| 3,560,092 | A * | 2/1971 | Coney | B42F 9/001 434/248 |
| 5,638,151 | A * | 6/1997 | Berardi | G03B 31/00 340/332 |
| 7,200,320 | B1 * | 4/2007 | Denecke | G03B 17/24 348/E5.022 |
| 2009/0231492 | A1 * | 9/2009 | Wayne | G11B 27/3009 348/722 |
| 2020/0253678 | A1 * | 8/2020 | Hulford | A61B 34/35 |

OTHER PUBLICATIONS

Fotodiox Movie Chalk Clapboard, Film Production Director's Slateboard Clapper "https://web.archive.org/web/20150306080847/https://www.amazon.com/Fotodiox-Movie-Clapboard-Production-Slate/dp/B0095PTKRA", Mar. 6, 2015 (via Internet Wayback Machine).*
Cavision Next-gen Clock Slate PLUS with LED Light "https://www.youtube.com/watch?v=4iP0PZgMvOM", May 1, 2015.*
Next-Gen Clock Slate With Strobe Light "https://web.archive.org/web/20160815125523/http://www.cavision.com/slate/nextgenclockslate.htm", Aug. 15, 2016 (via Internet Wayback Machine).*

* cited by examiner

*Primary Examiner* — Michael E Teitelbaum
(74) *Attorney, Agent, or Firm* — Patentfile, LLC; Bradley C. Fach; Steven R. Kick

(57) ABSTRACT

A production slate device may include a first arm having a first distal end, and a second arm having a second distal end. A hinge may movably couple the arms together so that the first distal end and second distal end form the portions of the arms that are distal to the hinge, and the hinge may enable the device to be moved into and between a closed position, in which the distal ends are proximate to or in contact with each other, and an open position, in which the distal ends are moved apart from each other. A board plate may be coupled to the second arm. The board plate may have a board length dimension (BL), and the second arm may have a total length dimension (TL). Preferably, the BL is less than 80 percent of the TL.

19 Claims, 8 Drawing Sheets

PRODUCTION SLATE DEVICE

CROSS REFERENCE TO RELATED APPLICATIONS

This application claims priority to and the benefit of the filing date of U.S. Provisional Application No. 62/867,082, filed on Jun. 26, 2019, entitled "A compact production slate having full sized sticks and associated methods", which is hereby incorporated by reference in its entirety.

FIELD OF THE INVENTION

This patent specification relates to the field of production slates. More specifically, this patent specification relates to a compact multifunction production slate.

BACKGROUND

Currently there are a number of solutions for slating a scene for post-production audio synchronization purposes. Some of these solutions attempt to offer a way to slate scenes for post-production audio synchronization purposes, but these solutions fail to meet the needs of the industry because they do not offer many of the needed operations for the fast-paced TV and Film productions of today. Other solutions attempt to solve current concerns, but these solutions are similarly unable to meet the needs of the industry because they are not optimized efficiently and miss a large gap in the market between the relatively inexpensive "dumb" slate and the more relatively expensive smart/timecode slate. Still other solutions seek to be compact, but these solutions also fail to meet industry needs because they are not optimized efficiently.

Therefore, a need exists for novel production slates.

BRIEF SUMMARY OF THE INVENTION

A production slate device is provided. In some embodiments, the device may include a first arm having a first distal end, and a second arm having a second distal end. A hinge may movably couple the first arm to the second arm so that the first distal end and second distal end form the portions of the arms that are distal to the hinge, and the hinge may enable the device to be moved into and between a closed position, in which the distal ends are proximate to or in contact with each other, and an open position, in which the distal ends are moved apart from each other. A board plate may be coupled to the second arm. The board plate may have a board length dimension (BL), the second arm may have a total length dimension (TL), and the BL may be less than 80 percent of the TL. Preferably, the board plate may be coupled to the second arm so that it is positioned relatively closer to the second distal end than to the hinge.

In further embodiments, the board plate may be rotatably coupled to the second arm via a board hinge.

In further embodiments, the device may include one or more board light emitting elements that may be configured to illuminate when the device is moved into the closed position.

In further embodiments, the device may include a writing board coupled to the board plate, and the writing board may include a translucent material. The device may also have a plate light emitting element, and the plate light emitting element may be configured to communicate light through the translucent material.

In further embodiments, the device may include a writing implement that may be removably coupled to an arm, such as to the first arm or the second arm.

It is an object of the present invention to provide a non-timecode production slate that is compact and that offers easy one-handed use, still having full length clapper sticks (arms) for a full and robust clap sound.

Furthermore, an object of the present invention is to provide a production slate that integrates the slate writing surface and bottom stick into one unit.

Furthermore, an object of the present invention is to provide a non-timecode production slate with a board light emitting element that discharges upon clapping the arms together to aid in post-production audio synchronization and to have backlight functionality, via a plate light emitting element, on the writing surface of the writing board to illuminate the information written thereon during dim lighting situations.

The production slate device advantageously fills these needs and addresses the aforementioned deficiencies by providing a non-timecode compact and one-handed operation production slate with flash synchronization and backlight capabilities.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
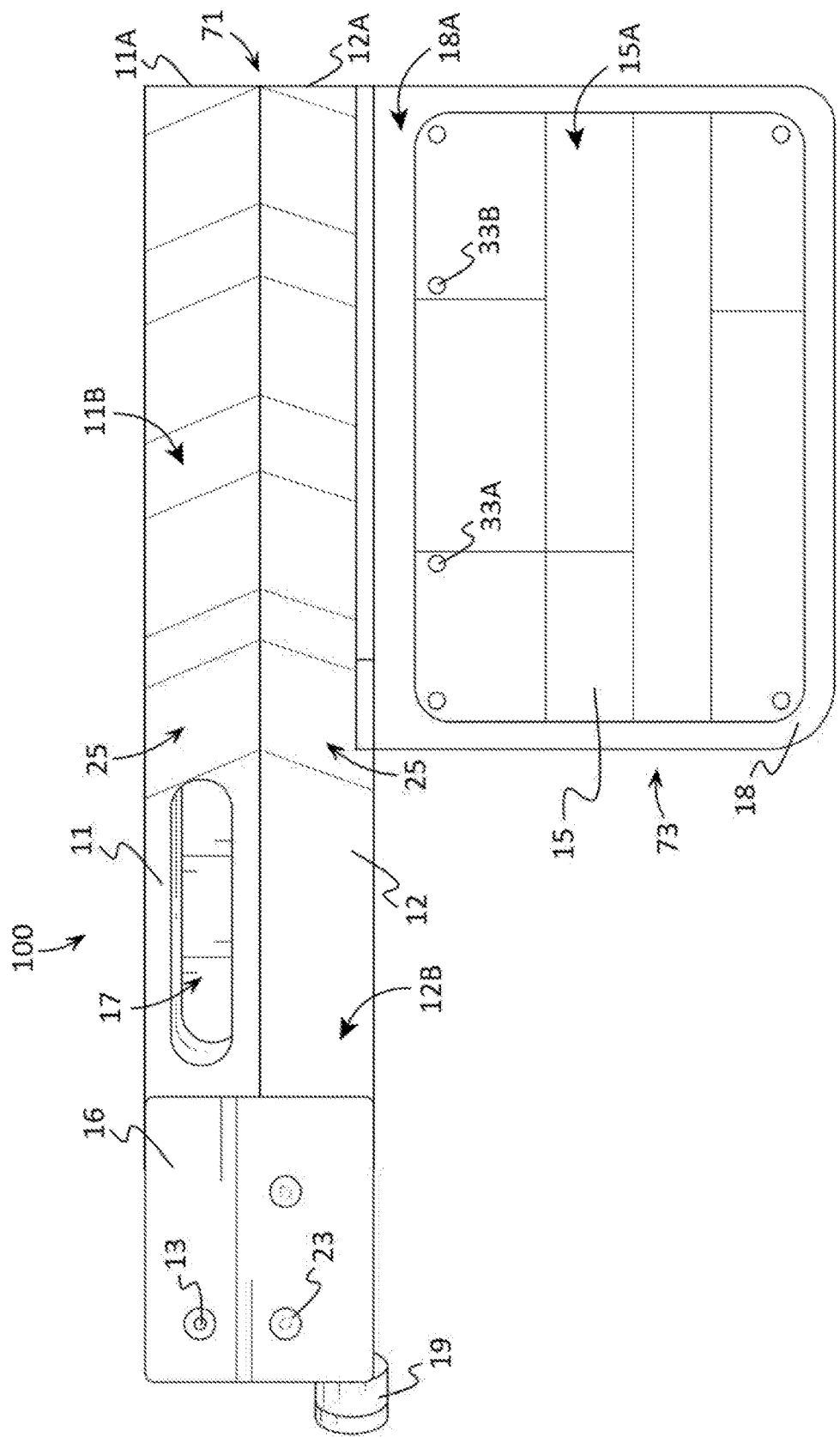
FIG. 1 depicts a front elevation view of an example of a production slate device according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc., are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new production slate device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 2:
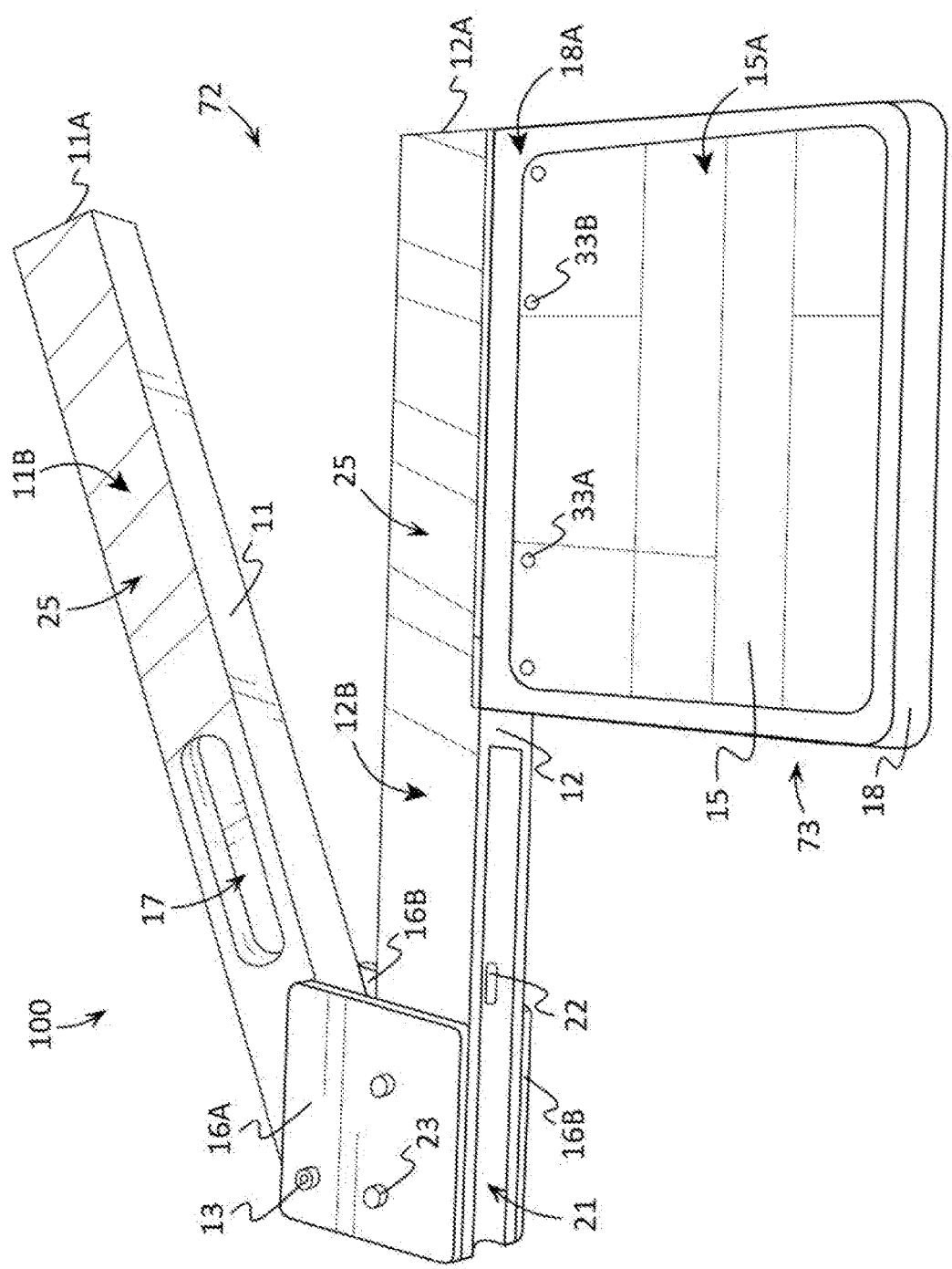
FIG. 2 illustrates a bottom, front perspective view of an example of a production slate device according to various embodiments described herein.
Figure 3:
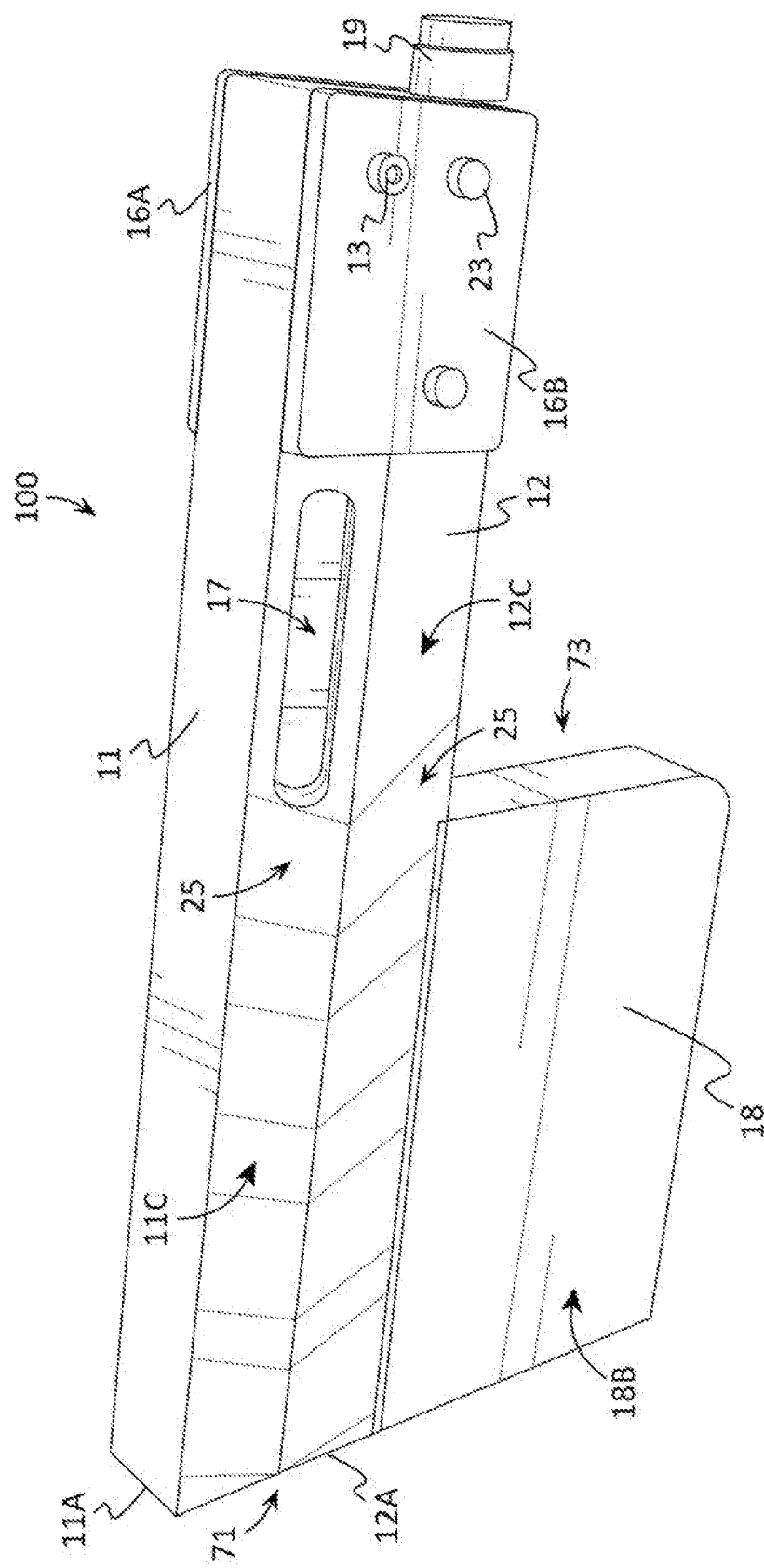
FIG. 3 shows a top, rear perspective view of an example of a production slate device according to various embodiments described herein.
Figure 4:
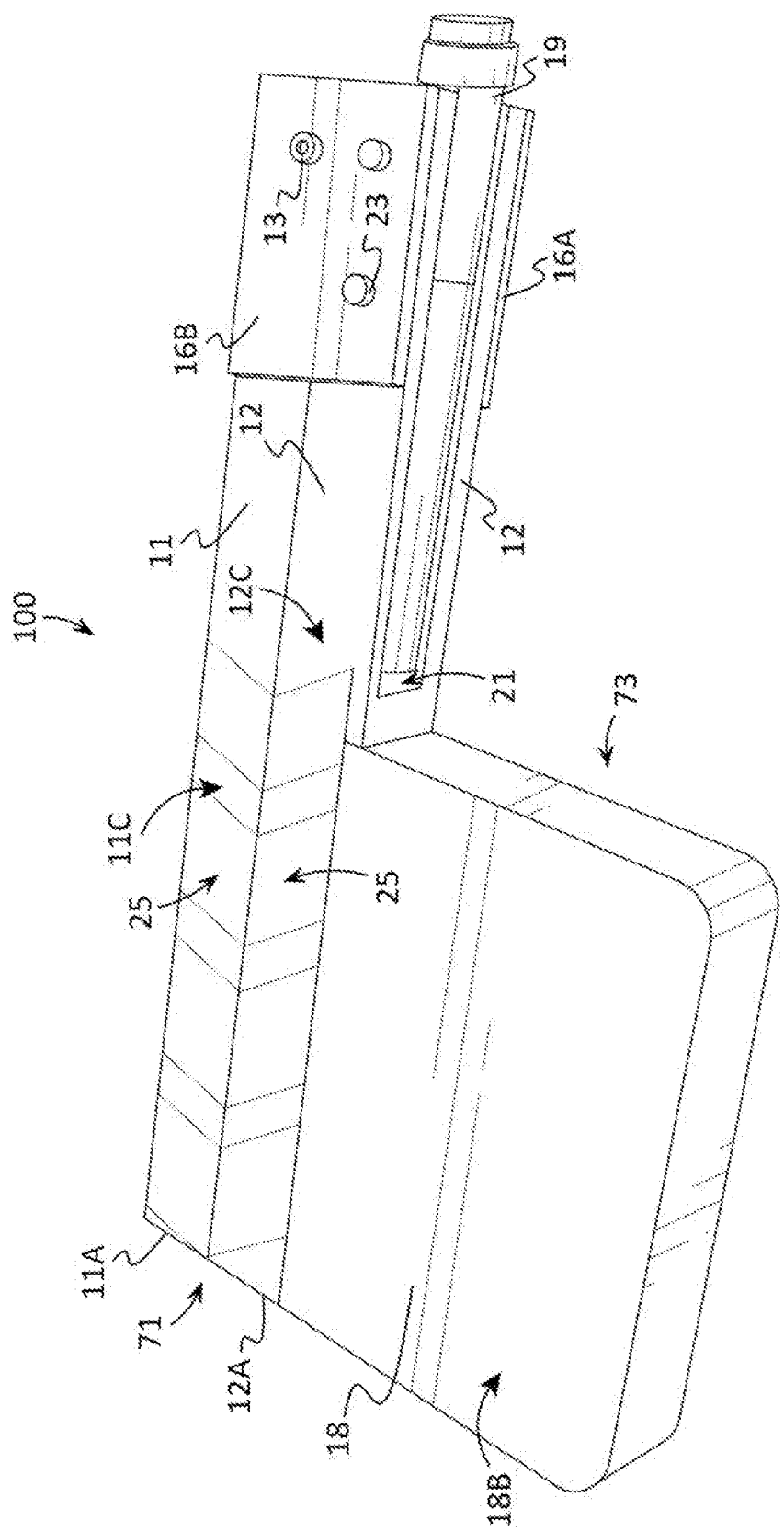
FIG. 4 depicts a bottom, rear perspective view of an example of a production slate device in a first position according to various embodiments described herein.
Figure 5:
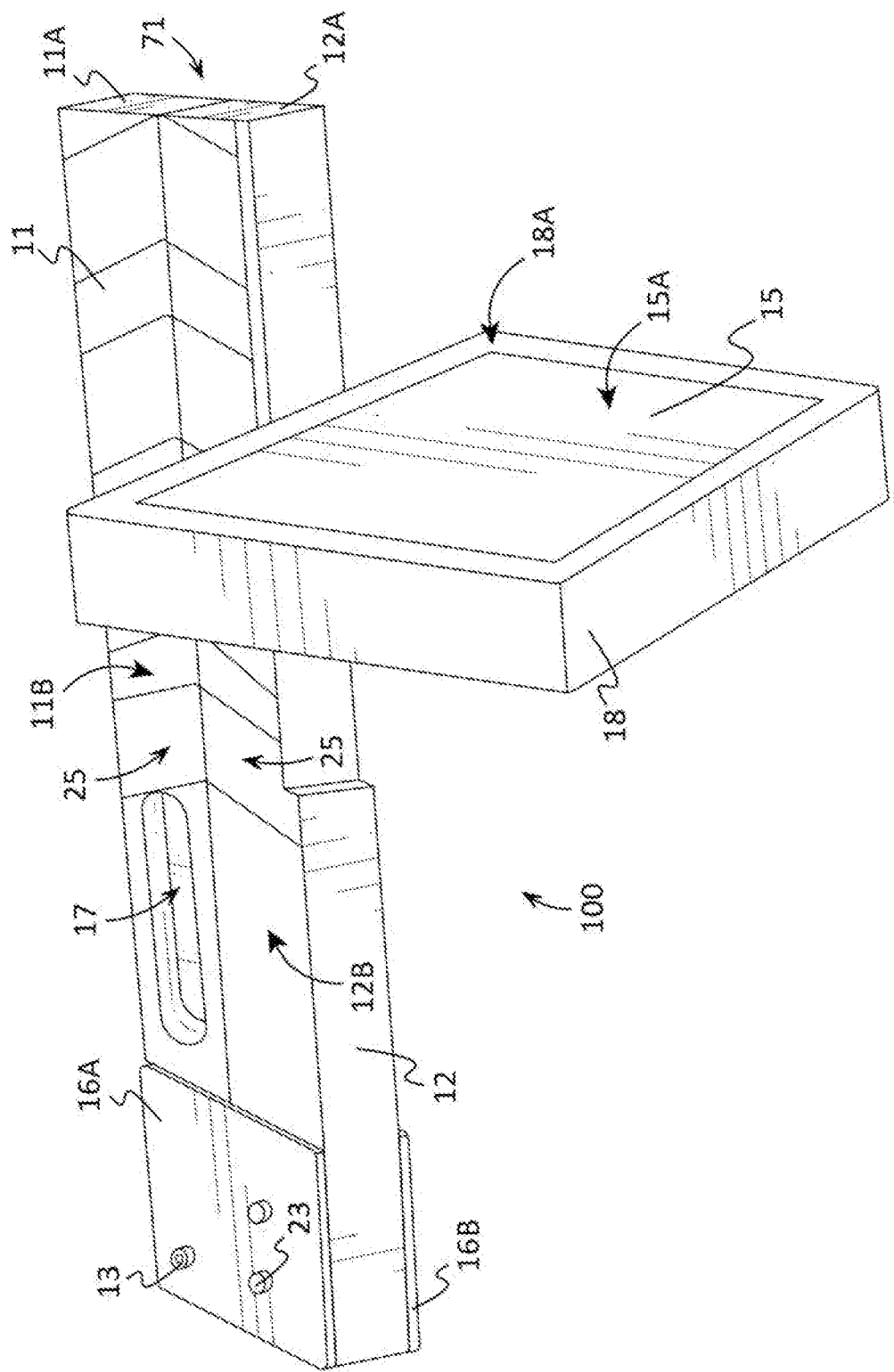
FIG. 5 illustrates a bottom, rear perspective view of an example of a production slate device being moved between a first position and a second position according to various embodiments described herein.

The present invention will now be described by example and through referencing the appended figures representing preferred and alternative embodiments. FIGS. 1-8 illustrate examples of a production slate device ("the device") 100 according to various embodiments. In some embodiments, the device 100 may comprise a first arm 11 and a second arm 12 which may be movably coupled together via an arm hinge 13. The first arm 11 may have a first distal end 11A, and the second arm 12 may have a second distal end 12A, and the distal ends 11A, 12A, may form the portions of the arms 11, 12, that are distal to the arm hinge 13. The arm hinge 13 may enable the device 100 to be moved into and between a closed position 71, in which the distal ends are proximate to or in contact with each other (FIGS. 1, 3-7), and an open position 72, in which the distal ends are moved apart from each other (FIG. 2). A board plate 18 may be coupled to the second arm 12 so that it is proximate to or in contact with the second distal end 12A. A writing board 15 may be coupled to the board plate 18.

Generally, the first 11 and second 12 arms may be moved from the open position 72 to the closed position 71 in order to generate a sound, typically a "clapping" sound, which may be used for audio/video syncing purposes. In preferred embodiments, the first 11 and second 12 arms may be moved from the open position 72 to the closed position 71 so that portions of the arms 11, 12, may impact each other to generate a sound, such as a "clapping" sound.

In preferred embodiments, the arms 11, 12, may be configured to have an elongated rectangular prism shape, in which the length dimension is much greater than the height and width dimensions. However, in further embodiments, arms 11, 12, may be configured in any shape and size, including elongated triangular prism shapes, elongated cylindrical shapes, etc.

In some embodiments, a first arm 11 may comprise a first front surface 11B and a first rear surface 11C, and the first front surface 11B and first rear surface 11C may be positioned on opposite sides of the first arm 11. Likewise, a second arm 12 may comprise a second front surface 12B and a second rear surface 12C, and the second front surface 12B and second rear surface 12C may be positioned on opposite sides of the second arm 12. The first 11B and second 12B front surfaces may be positioned on the same side of the device 100, and the first 11C and second 12C rear surfaces may be positioned on the same side of the device 100. Preferably, the first 11B and second 12B front surfaces may be approximately parallel to each other when the device 100 is in the closed position 71 and/or open position 72, and/or the first 11C and second 12C rear surfaces may be approximately parallel to each other when the device 100 is in the closed position 71 and/or open position 72.

In some embodiments, the device 100 may comprise arm indicia 25 which may be positioned on one or more surfaces of the first arm 11 and/or second arm 12, such as on a first front surface 11B, first rear surface 11C, second front surface 12B, second rear surface 12C, etc. In preferred embodiments, the first front surface 11B of the first arm 11 may comprise arm indicia 25 and the second front surface 12B of the second arm 12 may comprise arm indicia 25, and the arm indicia 25 may be mirrored copies of each other that may form white or other colored chevrons when the device 100 is moved into the closed position. In further preferred embodiments, the first rear surface 11C of the first arm 11 may comprise arm indicia 25 and the second rear surface 12C of the second arm 12 may comprise arm indicia 25, and the arm indicia 25 may be mirrored copies of each other that may form white or other colored chevrons when the device 100 is moved into the closed position.

In some embodiments, the device 100 may comprise one or more finger recesses 17 which may be positioned anywhere on the device 100. In preferred embodiments, a finger recess 17 may be positioned on a first front surface 11B and/or a finger recess 17 may be positioned on a first rear surface 11C. In further preferred embodiments, a first finger recess 17 may be positioned on a first front surface 11B and a second finger recess 17 may be positioned on a first rear surface 11C, and the two finger recesses 17 may be positioned approximately the same distance from the first distal end 11A. In further embodiments, a finger recess 17 may be positioned on a second front surface 12B and/or a finger recess 17 may be positioned on a second rear surface 12C. In still further embodiments, a first finger recess 17 may be positioned on a second front surface 12B and a second finger recess 17 may be positioned on a second rear surface 12C, and the two finger recesses 17 may be positioned approximately the same distance from the second distal end 12A. Generally, a finger recess 17 may comprise a depression or recess that may be depressed or recessed below a surface 11B, 11C, 12B, 12C, to which it may be positioned on or coupled to. In preferred embodiments, a finger recess 17 may comprise a generally stadium shape (geometric shape outline constructed of a rectangle with semicircles at a pair of opposite sides), while in other embodiments, a finger recess 17 may be configured in any other shape and size.

In some embodiments, the device 100 may include a writing implement 19 that may be removably coupled to an element of the device 100, such as to the first arm 11 or the second arm 12. Generally, a writing implement 19 or writing instrument is an object used to produce writing. For example, the device 100 may have one or more writing implements 19 that may include, chalk, pencils, crayons, ballpoint pens (often called a biro in many Commonwealth countries), and felt tip pens. In preferred embodiments, a writing implement 19 may comprise a felt tip marker, and more preferably a felt tip dry-erase marker.

In some embodiments, the device 100 may comprise an implement recess 21 which may form a recess, depression, channel, etc., which may be formed into an element of the device 100, such as into a first arm 11 and/or a second arm 12, and which may be sized and shaped to allow all or portions of a writing implement 19 to fit into or otherwise be received in the implement recess 21. An implement recess 21 may be configured in any size and shape. In preferred embodiments, an implement recess 21 may be formed into the second arm 12 so that the implement recess 21 is positioned on the opposite side of the second arm 12 relative to the first arm 11. In some embodiments, an implement recess 21 may be sized and shaped to be slightly smaller than portions of a writing implement 19 so that the writing implement 19 may be removably coupled to the device 100 by being frictionally retained in the implement recess 21. In further embodiments, an implement recess 21 and a writing implement 19 may each comprise a magnetic material 22 so that the writing implement 19 may be removably coupled to the device 100 by being magnetically retained in the implement recess 21.

In preferred embodiments, an arm 11, 12, may be made from or may comprise a substantially rigid material, such as steel alloys, aluminum, aluminum alloys, copper alloys, other types of metal or metal alloys, ceramics such as alumina, porcelain, and boron carbide, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, wood, other plant based materials, or any other material including combinations of materials that are substantially rigid and suitable for enduring repeated impacts which may result from portions of the arms 11, 12, being manipulated into colliding with each other, such as for generating a clapping sound or the like. In further embodiments, an arm 11, 12, may be made from or may comprise a flexible or resilient material, including cushioning materials, such as silicone foams, rubber foams, urethane foams including plastic foams, neoprene foam, latex foam rubber, polyurethane foam rubber, or elastomer materials such as elastic plastics, elastic silicone, elastic rubbers; and/or any other material including combinations of materials.

In some embodiments, a first arm 11 and second arm 12 may be movably coupled together via an arm hinge 13 which may enable the arms 11, 12, to be moved into and between the open 72 and closed 71 positions. An arm hinge 13 may be a pivotal coupling that may include a rivet, bearing, such as a bushing, a journal bearing, a sleeve bearing, a rifle bearing, a rolling-element (e.g. ball or roller) bearing, a jewel bearing, a fluid bearing, a magnetic bearing, a flexure bearing, a composite bearing, nut and bolt, knuckle joint, a turnbuckle, a pin joint, a pivot joint, a cotter joint, a bolted joint, a flexible material joint, a screw joint, a universal joint, a butt hinge, butterfly hinge, flush hinge, barrel hinge, concealed hinge, continuous hinge, T-hinge, strap hinge, double-acting hinge, Soss hinge, a flexible material hinge, a four-bar linkage, a scissor linkage, a collapsible pole linkage, or any other suitable mechanical or physical linkage which may be used to couple a first element or component to a second element or component while allowing the first element or component to move, pivot, or rotate relative to the second element or component.

In some embodiments, the device 100 may comprise one or more hinge plates 16, such as a first hinge plate 16A and a second hinge plate 16B which may be used to couple an arm hinge 13 to one or both arms 11, 12. For example, an arm hinge 13 may be coupled to both a hinge plate 16 and to the second arm 12 while the arm hinge 13 may also be coupled to the first arm 11, and the hinge plate 16 may structurally reinforce the arm hinge 13 to arm 11, 12, coupling. A hinge plate 16A, 16B, may be configured in a generally rectangular plate shape or any other shape and size. One or more fasteners 23, such as screws, bolts and nuts, rivets, etc., may be used to couple a hinge plate 16 to another hinge plate 16, first arm 11, and/or second arm 12. Optionally, an arm hinge 13 may comprise or may be a fastener 23.

The device 100 may comprise a board plate 18 which may be coupled to the second arm 12 so that the board plate 18 and first arm 11 are positioned on opposite sides of the second arm 12 when the device 100 is in the closed positioned 71. In some embodiments, the board plate 18 may be coupled to the second arm 12 so that it is positioned relatively closer to the second distal end 12A than to the arm hinge 13. In further embodiments, the board plate 18 may be coupled to or substantially proximate to the second distal end 12A of the second arm 12.

A board plate 18 may be configured in any size and shape. In preferred embodiments, a board plate 18 may comprise a generally rectangular prism shape having a plate front surface 18A and a plate rear surface 18B, and the plate surfaces 18A, 18B, may be positioned on opposite sides of the board plate 18. In further preferred embodiments, the plate surfaces 18A, 18B, may be generally rectangular in shape. In further preferred embodiments, one or both of the plate surfaces 18A, 18B, may form the largest surface(s) of the board plate 18.

Figure 7:
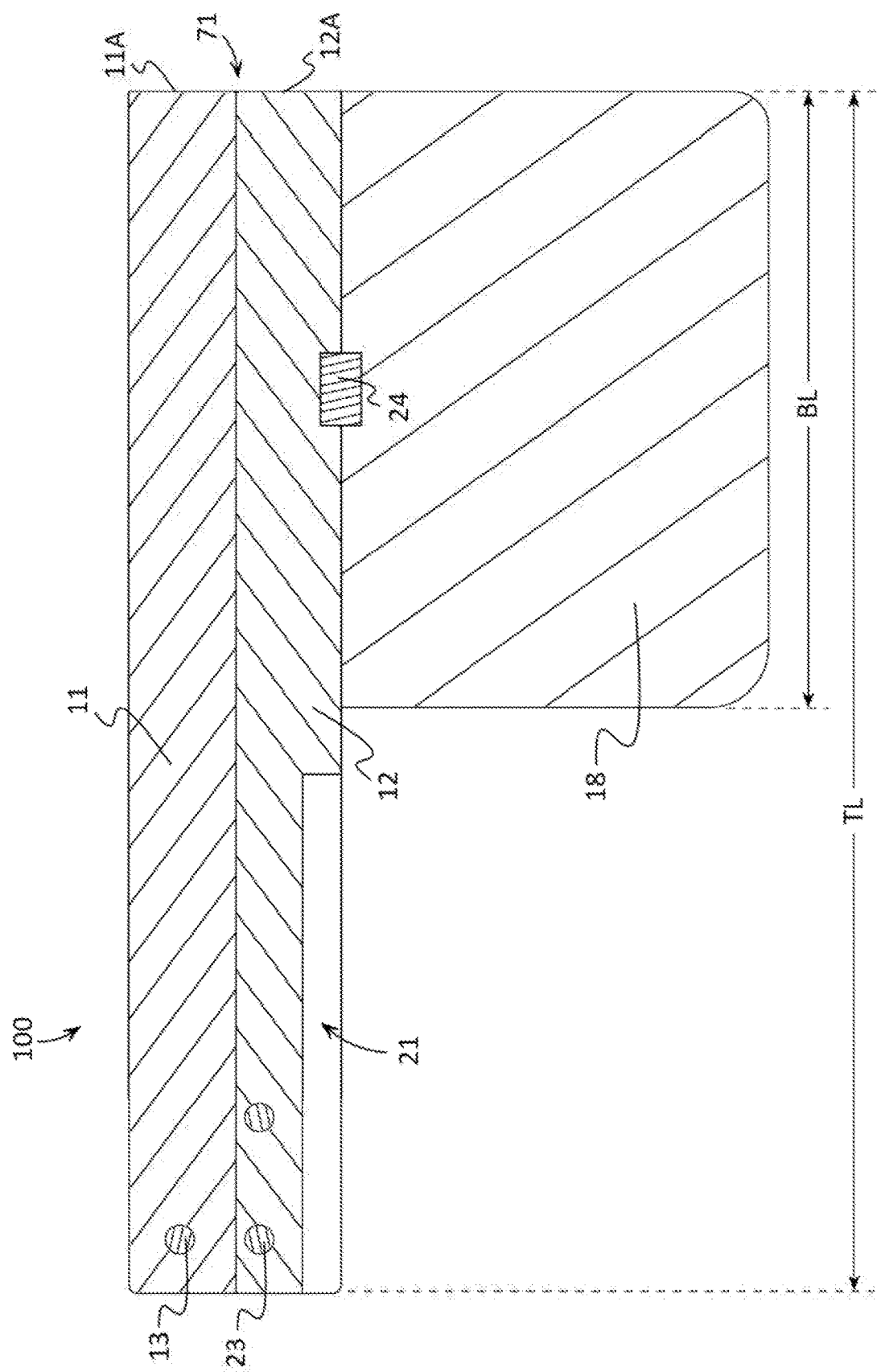
FIG. 7 depicts a sectional, elevation view of an example of a production slate device according to various embodiments described herein.

Referring to FIG. 7, in some embodiments, the board plate 18 may comprise a board length dimension (BL) which may describe the length of the board plate 18, such as which may be measured across a plate front surface 18A. The device 100 may further comprise a total length dimension (TL) which may describe the length of the second arm 12 including the length of any other structural element of the device 100, such as an arm hinge 13 and/or hinge plate 16, that may be coupled to the second arm 12 as measured approximately perpendicular to the second distal end 12A. In some embodiments, the BL may be less than 80 percent of the TL, and preferably the board plate 18 may be coupled to the second arm 12 so that it is positioned relatively closer to the second distal end 12A than to the arm hinge 13. In further embodiments, the BL is less than 60 percent of the TL. In still further embodiments, the BL may be less than or equal to 50 percent of the TL. In still further embodiments, a board plate 18 may be coupled to the second arm 12, hinge 13, and/or a hinge plate 16 so that it is positioned anywhere between the second distal end 12A and the arm hinge 13, including by being positioned relatively closer to the arm hinge 13 than to the second distal end 12A.

Figure 6:
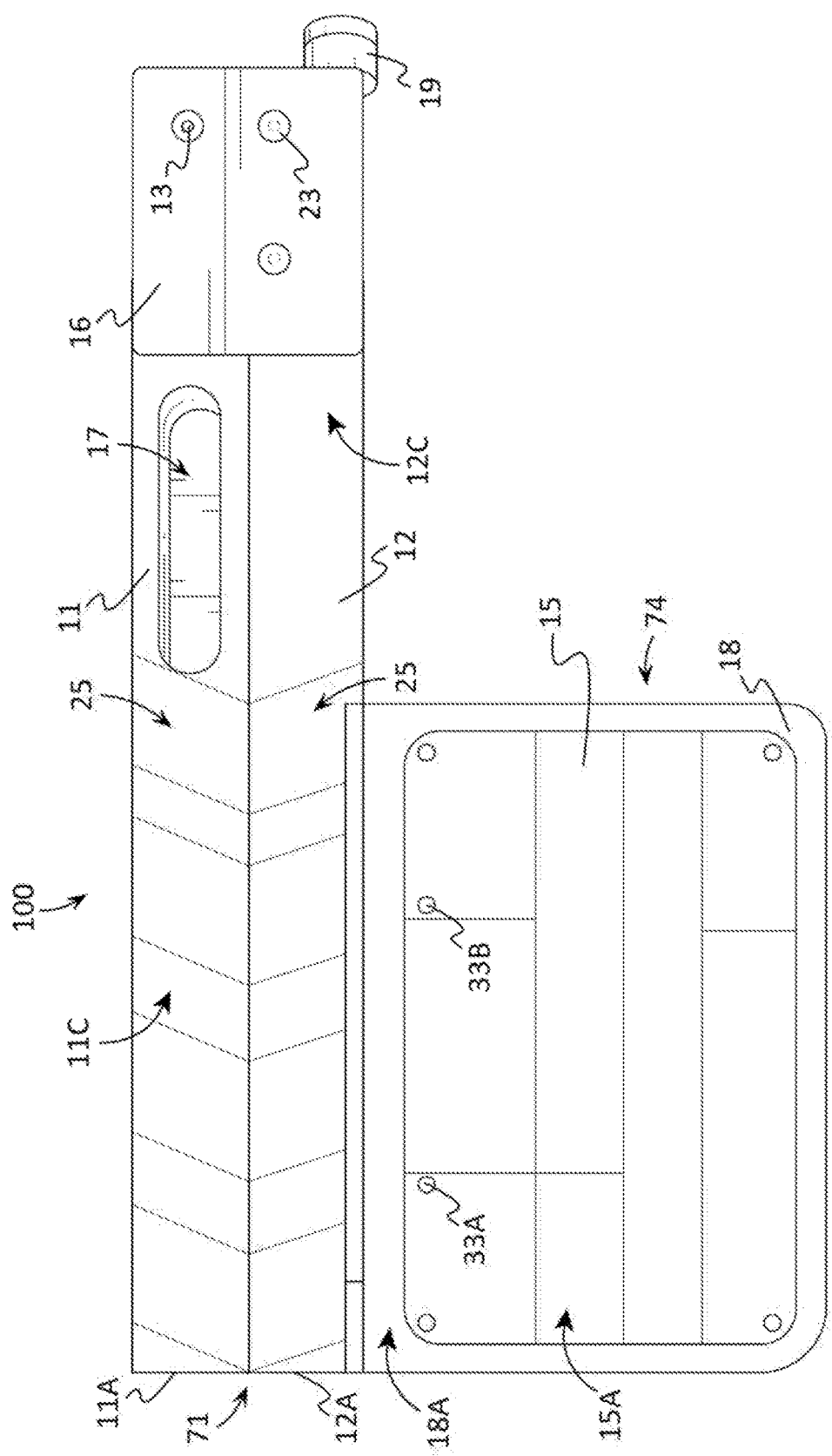
FIG. 6 shows an elevation view of an example of a production slate device in a second position according to various embodiments described herein.

In some embodiments, the device 100 may comprise a board plate 18 that may be rotatably coupled to the second arm 12 via a board hinge 24 which may allow the board plate 18 to be rotated relative to the second arm 12. In this manner, the board plate 18 may be rotated so that the board plate 18 may be moved into and between a first position 73, in which the plate front surface 18A may be positioned proximate to and approximately parallel to the first front surface 11B and second front surface 12B (FIGS. 1 and 2), and a second position 74, in which the plate front surface 18A may be positioned proximate to and approximately parallel to the first rear surface 11C and second rear surface 12C (FIG. 6). A board hinge 24 may comprise a pivotal coupling, such as which may be used to form an arm hinge 13 or any other movable coupling which may allow the board plate 18 to be moved into and between a first position 73 and a second position 74.

In some embodiments, the device 100 may comprise one or more writing boards 15 which may be coupled, optionally removably coupled, to the board plate 18. A writing board 15 may comprise a writing surface 15A upon which a user may write information, such as with a writing implement 19. Preferably, the device 100 may comprise a writing board 15 that may be coupled to a plate front surface 18A and/or a plate rear surface 18B. A writing board 15 may be configured in any size and shape and may provide a writing surface 15 upon which a user may write information, such as by using a writing implement 19. In preferred embodiments, a writing board 15 may comprise a generally rectangular shape which may be equal to or smaller than the shape of a plate front surface 18A and/or a plate rear surface 18B. A writing board 15 may be made from any material. In preferred embodiments, a writing board 15 may be made from or may comprise a Thermoplastic, such as polyethylene (PE), polypropylene (PP) and polyvinyl chloride (PVC), polycarbonate, nylon, Poly(methyl methacrylate) (PMMA) also known as acrylic, melamine, fiberglass, carbon fiber, resins, such as epoxy resin, wood, bamboo, or any other material including combinations of materials that are substantially rigid and suitable for being written on by dry-erase type of writing implements 19. In further embodiments, a writing board 15 may be made from or may comprise any material which may be written on by a writing implement 19.

In preferred embodiments, the device 100 may comprise a writing board 15 having a writing surface 15A which may be made from or may comprise a translucent material which may allow light to pass through the writing board 15 to illuminate the writing surface 15A. Example materials which may be substantially transparent or translucent include plastics such as polycarbonate, acrylic or polyacrylate made from Methyl Methacrylate (MMA), Poly Methyl Methacrylate, polystyrene, and glass. In further preferred embodiments, the device 100 may comprise one or more plate light emitting elements 31, and the plate light emitting element(s) 31 may be configured to communicate light through a translucent material that may form all or parts of a writing board 15.

Figure 8:
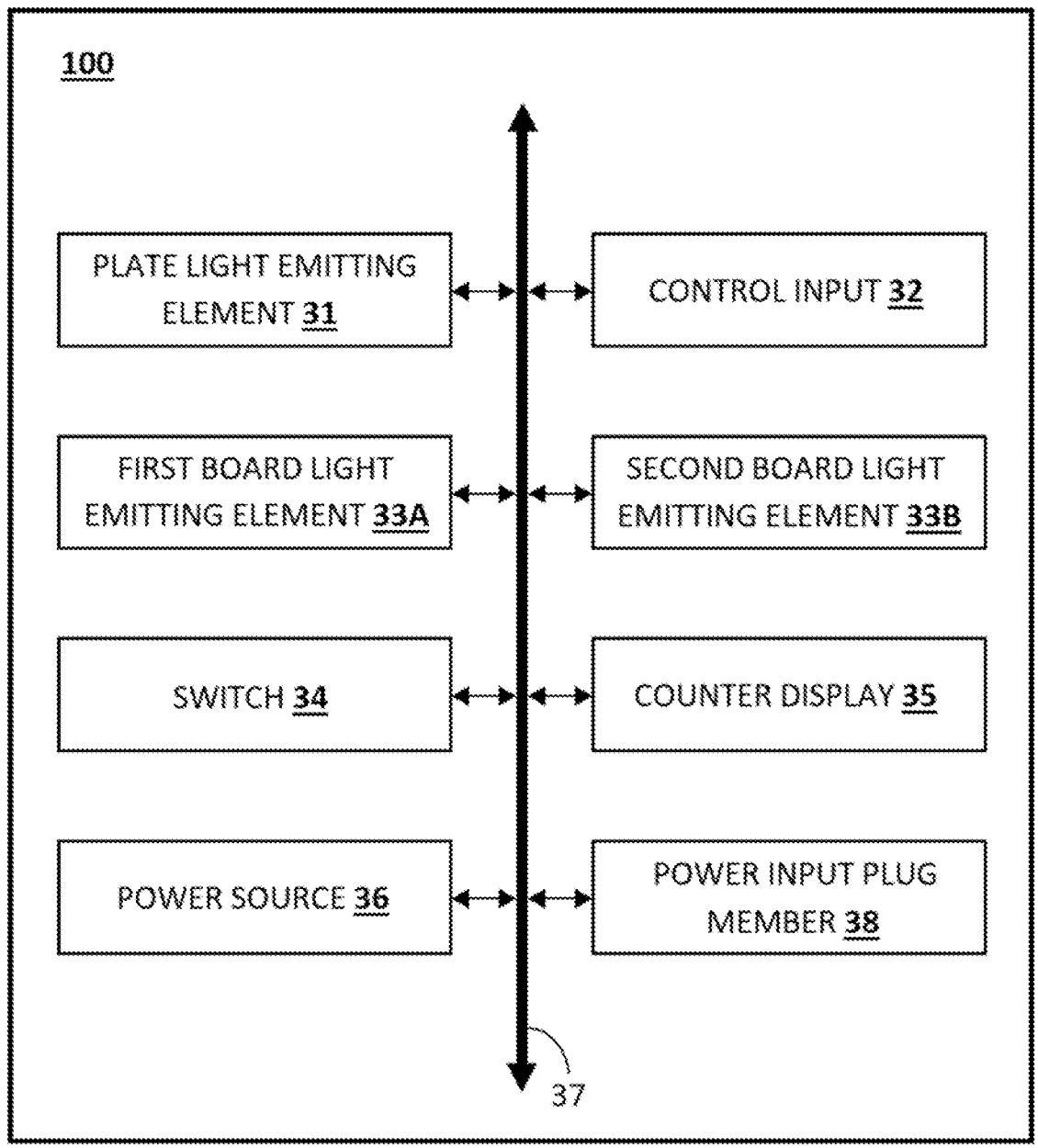
FIG. 8 illustrates a block diagram of an example of a production slate device according to various embodiments described herein.

As perhaps best shown in FIG. 8, in some embodiments, the device 100 may include one or more electronic elements or components, such as a plate light emitting element 31, control input 32, board light emitting element 33, switch 34, counter display 35, and/or power source 36. Components (31, 32, 33, 34, 35, 36, and 38) may communicatively coupled via a local interface 37. A local interface 37 can be, for example but not limited to, one or more buses, circuit boards, wiring, or other wired or wireless connections, as is known in the art. A local interface 37 can have additional elements, which are omitted for simplicity, such as controllers, buffers (caches), drivers, repeaters, and receivers, among many others, to enable communications. Further, a local interface 37 may include address, control, and/or data connections to enable appropriate communications among the aforementioned components.

In some embodiments, the device 100 may comprise one or more plate light emitting elements 31. Preferably, a plate light emitting element 31 may be coupled to a board plate 18 and/or a writing board 15 and configured to illuminate all or portions of the writing board 15. For example, plate light emitting element(s) 31 may be positioned inside the board plate 18 and configured to communicate light through a translucent material that may form all or parts of a writing surface 15A of a writing board 15. In some embodiments, a plate light emitting element 31 may comprise a light emitting diode (LED) which may be configured to provide light of various wavelengths and intensities. In further embodiments, a plate light emitting element 31 may comprise an organic light-emitting diode (OLED), incandescent light bulb, fluorescent light, bulb halogen light bulb, high-intensity discharge light bulb, electroluminescent light source, neon light source, light strips, chemical light generating devices, such as glow sticks, or any other type of suitable light source.

In some embodiments, the device 100 may comprise one or more control inputs 32 which may be configured to govern the ability, the brightness, the color, or other aspect of illumination which may be provide by a plate light emitting element 31 and/or a board light emitting element 33. In preferred embodiments, a control input 32 may be operable to turn a plate light emitting element 31 on, off, and into two or more brightness settings. Generally, a control input 32 may be an input device that a user may interact with, such as turnable control knobs, depressible button type switches, a key pad, slide type switches, rocker type switches, or any other suitable input that may be used to control functions of an electrical component of the device, such as a plate light emitting element 31 and/or a board light emitting element 33.

In some embodiments, the device 100 may comprise one or more board light emitting elements 33A, 33B. A board light emitting element 33A, 33B, may comprise any type of light emitting element, such as which may be used to form a plate light emitting element 31. Generally, a board light emitting element 33A, 33B, may be distinguishable from a plate light emitting element 31 in that a plate light emitting element 31 may generally function as a backlight for illuminating portions of a writing board 15, a board light emitting element 33A, 33B, may function as a small light that may momentarily illuminate upon moving the device 100 into the closed position 71. In this manner, a board light emitting element 33A, 33B, may simultaneously flash with the sound produced by the impact of the first arm 11 and second arm 12 when the device is moved into the closed position 71.

In preferred embodiments, the device 100 may comprise a first board light emitting element 33A that is configured to illuminate when the device 100 is moved into the closed position 71. In further preferred embodiments, the device 100 may comprise a second board light emitting element 33B that is configured to illuminate when the device 100 is moved into the closed position 71. In still further preferred embodiments, a board first 33A and/or a board second 33B light emitting element may be configured to illuminate for less than one second when the device 100 is moved into the closed position 71.

In some embodiments, the device 100 may comprise a switch 34 which may cause the one or more board light emitting elements 33A, 33B, to illuminate when the device 100 is moved into the closed position 71. For example, a switch 34 may comprise a push button switch that engages a circuit causing the one or more board light emitting elements 33A, 33B, to illuminate when the device 100 is moved into the closed position 71. A switch 34 may comprise a moment switch, detent switch, single pole switch, electric eye, Hall effect sensor, pressure switch, electrical circuit, a reed switch, a contact sensor, a button mount, an ambient light sensor, Capacitive transducer, Capacitive displacement sensor, Eddy-current sensor, Ultrasonic sensor, Grating sensor, Inductive non-contact position sensors, Laser Doppler Vibrometer (optical), Linear variable differential transformer (LVDT), Multi-axis displacement transducer, Photodiode array, Piezo-electric transducer (piezoelectric), Potentiometer, Proximity sensor (optical), Rotary encoder (angular), Seismic displacement pick-up, String potentiometer (also known as string pot, string encoder, cable position transducer), or any other suitable sensor to detect when the device 100 is moved into the closed position 71.

In some embodiments, the device 100 may comprise a counter display 35 that is configured to visually output timecode, such as SMPTE/EBU timecode. For example, a counter display 35 may be configured to visually output timecode in the Society of Motion Picture and Television Engineers SMPTE 12M specification. Generally, a counter display 35 may be configured to generate digital timecode on the device 100. For example, a counter display 35 may comprise a timecode display function that illuminates via a driver circuit that is coupled to a clock circuit. Preferably, a counter display 35 may be coupled to the board plate 18 and/or writing board 15. A counter display 35 may comprise any type of display device, such as a Liquid crystal display (LCD), Light-emitting diode display (LED), Electroluminescent display (ELD), Electronic paper, E Ink, Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, and/or Interferometric modulator display (IMOD)

In some embodiments, the device 100 may comprise a power source 36 which may provide electrical power to any component that may require electrical power. A power source 36 may comprise a battery, and more preferably a rechargeable battery, such as a lithium ion battery, nickel cadmium battery, any other type of battery, such as an alkaline battery, a fuel cell, a capacitor, a super capacitor, or any other type of energy storing and/or electricity releasing device. In further embodiments, a power source 36 may comprise a power cord, kinetic or piezo electric battery charging device, a solar cell or photovoltaic cell, and/or inductive charging or wireless power receiver. In further embodiments, a power source 36 may comprise a power charging and distribution module which may be configured to control the recharging of the power source 36, discharging of the power source 36, and/or distribution of power to one or more components of the device 100 that may require electrical power.

In some embodiments, the device 100 may comprise a power input plug member 38 (FIGS. 3 and 6) which may be configured to mate with a complementary external plug member which may be configured to supply electrical power to the device 100. The power input plug member 38 may be in electrical communication with the power source 36. Once the power input plug member 38 is mated with a complementary external plug member, electrical power may be communicated from the external plug member, through the power input plug member 38, and to the power source 36 thereby allowing the power source 36 to be charged or recharged by the external plug member.

In preferred embodiments, a power input plug member 38 may comprise a USB connector such as a female micro-USB or female mini-USB. In other embodiments, a power input plug member 38 may comprise a male or female Type A USB plug, a Type B USB plug, a Mini-A USB plug, a Mini-B USB plug, a Micro-A USB plug, a Micro-B USB plug, a Micro-B USB 3.0 plug, a ExtMicro USB plug, a Lightning plug, a 30-pin dock connector, a Pop-Port connector, a Thunderbolt plug, a Firewire plug, a Portable Digital Media Interface (PDMI) plug, a coaxial power connector plug, a barrel connector plug, a concentric barrel connector plug, a tip connector plug, or any other plug, connector, or receptacle capable of enabling electrical communication.

While some exemplary shapes and sizes have been provided for elements of the device 100, it should be understood to one of ordinary skill in the art that the first arm 11, second arm 12, board plate 18, writing board 15, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A production slate device, the device comprising:
   a first arm having a first distal end, a first front surface, and a first rear surface;
   a second arm having a second distal end, a second front surface, and a second rear surface;
   an arm hinge movably coupling the first arm to the second arm so that the first distal end and second distal end form portions of the arms that are distal to the arm hinge, wherein the arm hinge enables the device to be moved into and between a closed position, in which the distal ends are proximate to or in contact with each other, and an open position, in which the distal ends are moved apart from each other; and
   a board plate having a plate front surface, the board plate rotatably coupled to the second arm with a board hinge acting as a pivotal coupling, the board hinge positioned at a location in between the arm hinge and the second distal end and configured to allow the board plate to rotate relative to the second arm into and between a first position in which the plate front surface is positioned parallel to the first front surface and second front surface, and a second position in which the plate front surface is positioned parallel to the first rear surface and second rear surface, and wherein the board plate comprises a board length dimension (BL), wherein the device comprises a total length dimension (TL).

2. The device of claim 1, wherein the BL is less than 60 percent of the TL.

3. The device of claim 1, further comprising a finger recess coupled to the first arm.

4. The device of claim 1, further comprising a first board light emitting element that is configured to illuminate when the device is moved into the closed position.

5. The device of claim 4, further comprising a second board light emitting element that is configured to illuminate simultaneously with the first board light emitting element when the device is moved into the closed position.

6. The device of claim 5, wherein the board first and second light emitting elements are configured to illuminate for less than one second when the device is moved into the closed position.

7. The device of claim 1, further comprising a writing board coupled to the board plate, wherein the writing board comprises a translucent material, and further comprising a plate light emitting element, wherein the plate light emitting element is configured to communicate light through the translucent material.

8. The device of claim 1, further comprising a writing implement that is removably coupled to an arm, the arm selected from the first arm and the second arm.

9. The device of claim 1, wherein the board plate is coupled to the second arm so that it is positioned relatively closer to the second distal end than to the arm hinge.

10. The device of claim 1, further comprising a rechargeable power source.

11. A production slate device, the device comprising:
    a first arm having a first distal end, a first front surface, and a first rear surface;
    a second arm having a second distal end, a second front surface, and a second rear surface;
    an arm hinge movably coupling the first arm to the second arm so that the first distal end and second distal end form portions of the arms that are distal to the arm hinge, wherein the arm hinge enables the device to be moved into and between a closed position, in which the distal ends are proximate to or in contact with each other, and an open position, in which the distal ends are moved apart from each other;
    a board plate having a plate front surface, the board plate coupled to the second arm with a pivotal coupling, wherein the board plate is rotatably coupled to the second arm at a position below the second arm and in between the arm hinge and the second distal end, the pivotal coupling configured to allow the board plate to rotate relative to the second arm into and between a first position in which the plate front surface is positioned parallel to the first front surface and second front surface, and a perpendicular position in which the plate front surface is positioned perpendicular to the first front surface and second front surface, and wherein the board plate comprises a board length dimension (BL), wherein the device comprises a total length dimension (TL), and wherein the board plate is coupled to the second arm so that it is positioned relatively closer to the second distal end than to the arm hinge; and
    a first board light emitting element that is configured to illuminate when the device is moved into the closed position.

12. The device of claim 11, wherein the BL is less than 60 percent of the TL.

13. The device of claim 11, further comprising a finger recess coupled to the first arm.

14. The device of claim 13, further comprising a second board light emitting element that is configured to illuminate simultaneously with the first board light emitting element when the device is moved into the closed position.

15. The device of claim 14, wherein the board first and second light emitting elements are configured to illuminate for less than one second when the device is moved into the closed position.

16. The device of claim 11, further comprising a writing board coupled to the board plate, wherein the writing board comprises a translucent material, and further comprising a plate light emitting element, wherein the plate light emitting element is configured to communicate light through the translucent material.

17. The device of claim 11, further comprising a writing utensil that is removably coupled to an arm, the arm selected from the first arm and the second arm.

18. The device of claim 11, further comprising a counter display that is configured to output timecode.

19. The device of claim 11, further comprising a rechargeable power source.

* * * * *